(12) United States Patent
Zheng et al.

(10) Patent No.: US 10,084,609 B2
(45) Date of Patent: *Sep. 25, 2018

(54) METHOD, APPARATUS, AND SYSTEM FOR CONTROLLING SMART HOME ENVIRONMENT USING LED LIGHTING DEVICE

(71) Applicant: SENGLED OPTOELECTRONICS CO., LTD., Tongxiang (CN)

(72) Inventors: Jianbing Zheng, Tongxiang (CN);
Chaoqun Sun, Tongxiang (CN);
Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,905

(22) Filed: Jan. 8, 2018

(65) Prior Publication Data

US 2018/0152312 A1    May 31, 2018

Related U.S. Application Data

(63) Continuation-in-part of application No. 15/026,451, filed as application No. PCT/CN2015/079339 on May 20, 2015, now Pat. No. 9,892,605.

(30) Foreign Application Priority Data

Nov. 10, 2014   (CN) .......................... 2014 1 0629459

(51) Int. Cl.
*H04L 12/28*   (2006.01)
*H05B 37/02*   (2006.01)

(52) U.S. Cl.
CPC ..... *H04L 12/2816* (2013.01); *H05B 37/0218* (2013.01); *H05B 37/0227* (2013.01)

(58) Field of Classification Search
CPC ........ G08B 13/19613; G08B 13/19636; G08B 13/19656; G08B 13/19684; G08B 25/08;
(Continued)

(56) References Cited

U.S. PATENT DOCUMENTS

| 7,868,912 B2 * | 1/2011 | Venetianer ........ G06F 17/30799 348/143 |
| 2005/0169367 A1 * | 8/2005 | Venetianer ........ G06F 17/30799 375/240.01 |
| 2014/0134954 A1 * | 5/2014 | Ruan .................. H05B 33/0803 455/66.1 |

FOREIGN PATENT DOCUMENTS

| CN | 101102481 A | * | 1/2008 |
| CN | 202282833 U | * | 6/2012 |

(Continued)

OTHER PUBLICATIONS

The World Intellectual Property Organization (WIPO) International Search Report for PCT/CN2015/079339 dated Aug. 11, 2015.

*Primary Examiner* — Sisay Yacob
(74) *Attorney, Agent, or Firm* — Anova Law Group, PLLC

(57) ABSTRACT

The present disclosure provides a smart home control system including at least one LED lighting device and at least one smart terminal. The LED lighting device includes an LED light-emitting module, a power supply module, a video acquisition module, a processing module and a communication module. The video acquisition module may be configured to collect video data within a camera detection range, and send the video data to the processing module. The processing module parses and recognizes the video data to detect behavioral information, generates control instructions according to the behavioral information, and controls the communication module to send the control instructions to the smart terminal. The system consistent with the present (Continued)

A smart home control server receives video data from an LED lighting device, and sends the video data to a processing module of a smart home control server. — S701

The processing module of the smart home control server parses and recognizes the video data to detect behavioral information, generates control instructions according to the behavioral information and controls a communication module of the smart home control server to send the control instructions to a corresponding smart terminal — S702 disclosure enables timely detection and prevention of illegal activities and/or unsafe behaviors, as well as recognition and execution of specified user instructions.

20 Claims, 5 Drawing Sheets

(58) Field of Classification Search
CPC ................ G08B 25/10; H04L 12/2825; H04L 2012/2841; H04M 1/72533
See application file for complete search history.

(56) References Cited

FOREIGN PATENT DOCUMENTS

| | | | |
|---|---|---|---|
| CN | 203616840 U | * | 5/2014 |
| CN | 203812384 U | | 9/2014 |
| CN | 104360599 A | | 2/2015 |
| KR | 101158058 B1 | | 6/2012 |
| TW | I435290 B | | 4/2014 |
| WO | WO 2009/003387 A1 | * | 1/2009 |
| WO | WO 2009003387 A1 | * | 1/2009 |

* cited by examiner

Smart Terminal 3

A smart home control server receives video data from an LED lighting device, and sends the video data to a processing module of a smart home control server. — S701

The processing module of the smart home control server parses and recognizes the video data to detect behavioral information, generates control instructions according to the behavioral information and controls a communication module of the smart home control server to send the control instructions to a corresponding smart terminal — S702

FIG. 7 a communication module of a smart terminal receives control instructions from a smart home control server and sends the control instructions to a processing module of the smart terminal — S801 the processing module of the smart terminal performs corresponding operations according to the control instructions — S802

FIG. 8

METHOD, APPARATUS, AND SYSTEM FOR CONTROLLING SMART HOME ENVIRONMENT USING LED LIGHTING DEVICE

CROSS-REFERENCES TO RELATED APPLICATIONS

This application is a continuation-in-part application of U.S. patent application Ser. No. 15/026,451, filed on Mar. 31, 2016. U.S. patent application Ser. No. 15/026,451 is a national stage application under 35 USC § 371(c) of PCT Application No. PCT/CN2015/079339, entitled "Method, Apparatus and System for Controlling A Smart Home Environment Using LED Lighting Device," filed on May 20, 2015, which claims the priority of Chinese Patent Application No. 201410629459.8, filed on Nov. 10, 2014. The entire disclosure and contents of the above applications are hereby incorporated by reference herein.

FIELD OF THE DISCLOSURE

The present disclosure generally relates to the field of lighting technologies and, more particularly, relates to a method, an apparatus, and a system for controlling a smart home environment using an LED lighting device.

BACKGROUND

An LED (Light Emitting Diode) device is a solid state semiconductor device that can directly convert electrical energy to visible light. LED technologies provide many advantages including energy conservation, environment protection, device practicability and stability, short response time, long operational lifetime, etc. To promote the low carbon life style and protect environment, LED technologies have been widely adopted in various lighting applications. LED lighting devices fit well into the developing trend of utilizing highly efficient and environmentally friendly lightings.

Nowadays, there are various home security devices and systems. Existing home security systems often employ specialized surveillance devices to monitor indoor environments. A monitoring personnel needs to watch surveillance videos to determine whether there is any illegal activity. However, this type of security systems is difficult to operate and may not provide timely detection and prevention of wrongful activities.

The disclosed method and system for audio broadcasting are directed to solve one or more problems set forth above and other problems in the art.

BRIEF SUMMARY OF THE DISCLOSURE

One aspect of the present disclosure provides an LED lighting device including an LED light-emitting module, a power supply module, a video acquisition module, a communication module and a processing module. The power supply module is electrically connected to the LED light-emitting module, the video acquisition module, the communication module and the processing module respectively. The processing module is electrically connected to the video acquisition module and the communication module. The video acquisition module may be configured to collect video data within a camera detection range, and send the video data to the processing module. The processing module may be configured to parse and process the video data to detect behavioral information, generate control instructions according to the behavioral information, and control the communication module to send the control instructions to a smart terminal.

Another aspect of the present disclosure provides a smart home control system including at least one LED lighting device and at least one smart terminal. The LED lighting device may include an LED light-emitting, a power supply module, a video acquisition module, a processing module and a communication module. The video acquisition module may be configured to collect video data within a camera detection range, and send the video data to the processing module of the LED lighting device. The processing module is configured to parse and process the video data to detect behavioral information, generate control instructions according to the behavioral information, and control the communication module to send the control instructions to the smart terminal. The smart terminal may be configured to receive the control instructions and execute the control instructions.

Another aspect of the present disclosure provides a smart home control method using an LED lighting device. The LED lighting device may include an LED light-emitting module, a power supply module, a video acquisition module, a processing module and a communication module. The video acquisition module may collect video data within a camera detection range, and send the video data to the processing module. The method further includes parsing and recognizing the video data to detect behavioral information, generating control instructions according to the behavioral information, and sending the control instructions to the smart terminal, by the LED lighting device. The smart terminal may receive the control instructions and execute the control instructions.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 7 is a flow chart illustrating another exemplary method for controlling a smart home environment using an LED lighting device consistent with various embodiments of the present disclosure;

FIG. 8 is a flow chart illustrating another exemplary method for controlling a smart home environment using an LED lighting device consistent with various embodiments of the present disclosure;

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
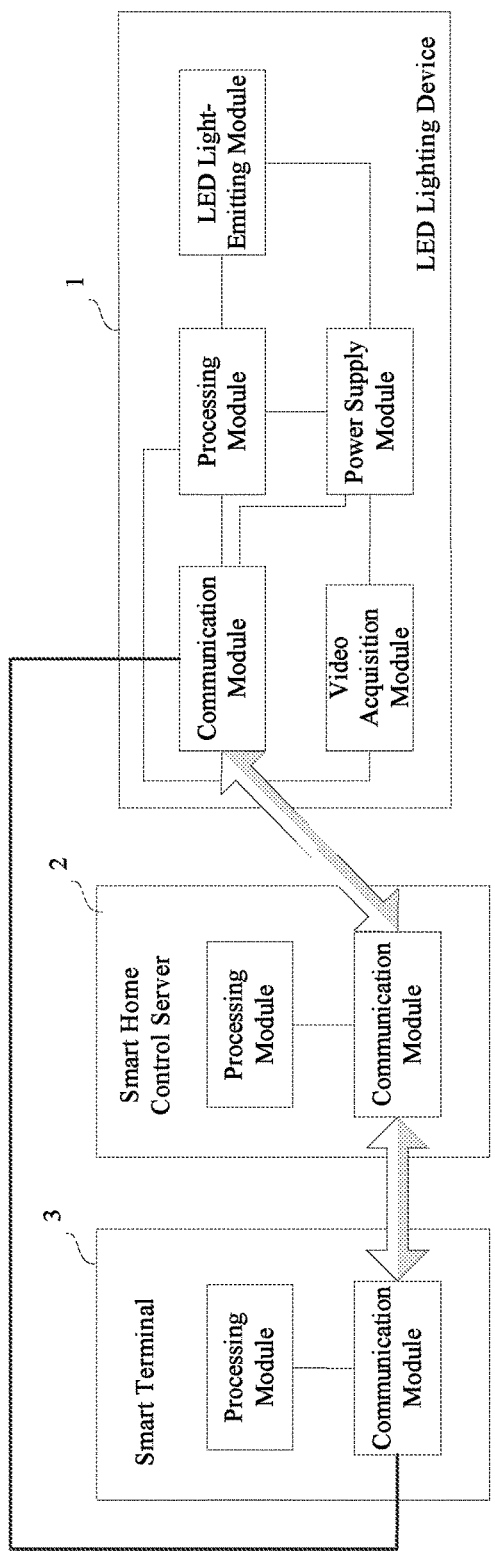
FIG. 1 is a structure diagram illustrating an exemplary system for controlling a smart home using LED lighting devices consistent with various embodiments of the present disclosure.

FIG. 1 is a structure diagram illustrating an exemplary system for controlling a smart home environment using LED lighting devices consistent with various embodiments of the present disclosure. As shown in FIG. 1, the exemplary system may include at least one LED lighting device 1, a smart home control server 2, and at least one smart terminal 3.

There is no limitation on the quantity of LED lighting devices. A user may configure the number of LED lighting devices according to the indoor room space and practical needs. Generally, a plurality of LED lighting devices may be distributed at different locations in an indoor and/or an outdoor space. The smart home control server 2 may be a server in the home network or a cloud server. The smart terminal 3 may be various household electrical appliances, such as a smart refrigerator, a smart air conditioner, a speaker, a smart phone, a smart watch, a tablet computer, a laptop computer, a telephone, etc. Different types and quantities of smart terminals should not limit the scope of the present disclosure. Users may select one or more smart terminals according to practical situations.

In the exemplary system for controlling a smart home environment using one or more LED lighting devices, the LED lighting device 1, the smart home control server 2 and the smart terminal 3 may form an integrated smart home control system by interacting with each other. The LED lighting device 1 and the smart home control server 2 may be configured to respectively include a communication module for performing data interactions between the LED lighting device 1 and the smart home control server 2. The smart terminal 3 may also be configured to include a communication module for exchanging signals with the smart home control server 2. In some embodiments, the LED lighting device 1 may further perform data interactions with the smart terminal 3 through their respective communication modules. In certain embodiments, the LED lighting device 1 may wirelessly communicate with the smart home control server 2. Further, the smart terminal 3 may also wirelessly communicate with the smart home control server 2. The communication modules may be a wireless communication module such as a WI-FI module, a Bluetooth module, etc. It is understood that the above-described communications may also be realized by wired connections.

The LED lighting device 1 may be configured to not only include a common LED light-emitting component to provide lighting, but also integrate a video acquisition module. The video acquisition module may be configured to collect video and/or image data in a detection range. The LED lighting device 1 may send the video data to the smart home control server 2 through the communication modules provided in the LED lighting device 1 and the smart home control server 2. After receiving the video data, the smart home control server 2 may perform image processing and recognition to detect behavioral information of a person and/or an object in the video. Further, the smart home control server 2 may generate control instructions according to the behavioral information and send the control instructions to the smart terminal 3 through the communication modules of the smart home control server 2 and the smart terminal 3.

It should be noted that, the smart terminal 3 may be any kind of home electrical appliances including the LED lighting device 1. The smart home control server 2 may also control the LED lighting device 1.

In one embodiment, the exemplary system may be used to recognize illegal activities and trigger corresponding control responses. For example, the smart home control server 2 may detect behavioral information in the video data about a person or an object breaking in a door or a window. Such behavioral information is recognized as an illegal activity. The smart home control server 2 may generate control instructions and send the control instructions to the smart terminal 3, such as a smart phone, the LED lighting device 1, and/or a speaker. The control instructions may be configured to control the smart terminal 3 to generate alarms by sound, light, and/or vibration. The smart terminal 3 may receive the control instructions and initiate the alarm. Further, the smart home control server 2 may also send control instructions to a telephone. The telephone may receive the control instructions and initiate a call to the police.

In another embodiment, the exemplary system may be used to recognize unsafe behaviors and trigger corresponding control responses. For example, the smart home control server 2 may detect behavioral information in the video data about an elderly person or a child tripping or falling. Such behavioral information is recognized as an unsafe behavior. The smart home control server 2 may generate control instructions and send the control instructions to the smart terminal(s) 3 such as a smart phone, and/or an LED lighting device. The control instructions may be configured to control the smart terminal 3 to generate alarms by sound, light and/or vibration. The smart terminal 3 may receive the control instructions and initiate an alarm.

In certain embodiments, to increase intelligent level of a smart home control system, besides recognizing illegal or unsafe activities and generate corresponding alarms, the exemplary system may further recognize users' specified instructive behaviors and perform corresponding controls. The specified instructive behaviors may include general activities of daily life. The specified instructive behaviors may be considered as behavioral information and recognized by the smart home control server 2. For example, the smart home control server 2 may detect a specified instructive behavior of a person drawing a circle in the air. The smart home control server 2 may recognize such behavior as turning the light on. For another example, the smart home control server 2 may detect a specified instructive behavior of a person of a person making a cross with his/her hands and recognize such behavior as turning the light off. In another example, the smart home control server 2 may detect a specified instructive behavior of a person doing a fanning gesture and recognize such behavior as turning on an air conditioner.

It is understood that users may customize different types of instructive behaviors and corresponding control instructions in the smart home control server 2 in advance. After recognizing an instructive behavior, the smart home control server 2 may generate control instructions and send to a corresponding smart terminal 3, an LED lighting device, or an air conditioner. The smart terminal 3 may operate according to the control instructions.

Direct data interactions between the LED lighting device 1 and the smart home control server 2 and signal exchanges between the smart home control server 2 and the smart terminal 3 may together enable various user controls over a smart home environment. Further, users may use the smart terminal 3 to configure the LED lighting device 1 and the smart home control server 2 according to practical needs. In certain embodiments, the smart terminal 3 may interact with the LED lighting device 1 through their communication modules and configure parameters of various functional components of the LED lighting device 1. The smart terminal 3 may also configure the smart home control server 2 through the communication modules. Details are described later in relation to other embodiments.

In the exemplary system for controlling a smart home environment using one or more LED lighting devices, the LED lighting device 1 may collect video data and send to the smart home control server 2 using data paths between the LED lighting device 1 and the smart home control server 2. The smart home control server 2 may parse the video data to detect behavioral information and generate corresponding control instructions. The smart home control server 2 may send control instructions to the smart terminal 3 through signal paths between the smart home control server 2 and the smart terminal 3. The smart terminal 3 may receive the control instructions and operate accordingly.

Comparing to the prior art, the exemplary system does not require additional components to set up specialized monitoring devices. The LED lighting devices may include integrated video acquisition capabilities, which is covert and may have good surveillance results. Further, such configuration may save spaces and make the smart home environment simple and comfortable. On the other hand, through interactions among the LED lighting device 1, the smart home control server 2 and the smart terminal 3, controlling the smart home environment may become more efficient and convenient. The exemplary system may enable timely detection and prevention of illegal activities and/or unsafe behaviors, as well as recognition and execution of specified user instructions, which may expand the applications of smart terminals at home.

The embodiments above describe the interaction process among three entities including the LED lighting device, the smart home control server and the smart terminal from a system perspective. The following embodiments will illustrate advantageous hardware improvements and/or software configurations of these entities.

Figure 9:
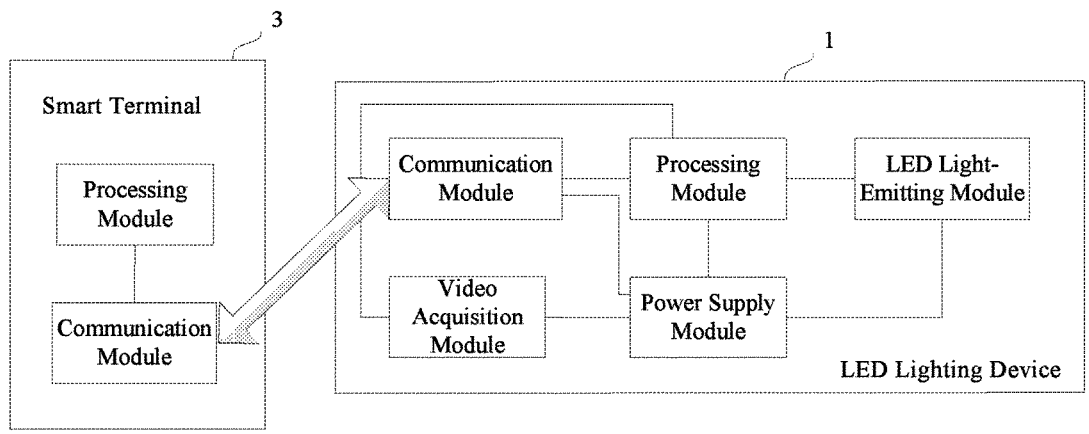
FIG. 9 is a structure diagram illustrating another exemplary system for controlling a smart home using LED lighting devices consistent with various embodiments of the present disclosure.

In some embodiments, some or all functionalities provided by the smart home control server 2 can be accomplished by the LED lighting device 1. FIG. 9 is a structure diagram illustrating another exemplary system for controlling a smart home using LED lighting devices consistent with various embodiments of the present disclosure. The exemplary system as shown in FIG. 9 may include at least one LED lighting device 1 and at least one smart terminal 3. The LED lighting device 1 and the smart terminal 3 may be configured to respectively include a communication module for performing data interactions between the LED lighting device 1 and the smart terminal 3, for example, by wireless communications.

The LED lighting device 1 and the smart terminal 3 shown in FIG. 9 may have the capacity to implement, at least, substantially the same functionalities as the LED lighting device 1 and the smart terminal 3 shown in FIG. 1. In addition, the LED lighting device 1 shown in FIG. 9 can be further configured to accomplish at least one of: performing image processing and recognition to detect behavioral information of a person and/or an object in the video (e.g., by the processing module of the LED lighting device 1), generating control instructions according to the behavioral information (e.g., by the processing module of the LED lighting device 1), or sending the control instructions to the smart terminal 3 (e.g., by the communication module of the LED lighting device 1). In other words, instead of relying on the smart home control server 2, image processing and/or control instruction generation can be accomplished locally on the LED lighting device 1. In some other embodiments, the image processing and/or control instruction generation can be accomplished by the smart terminal 3.

In some embodiments, the exemplary system may, according to certain processing scheme and conditions, select a first entity to perform image processing and recognition of behavioral information, select a second entity to generate the control instructions based on the behavioral information, and select a third entity to send the control instructions to the smart terminal 3. The first, second, and third entity may be selected among and the LED lighting device 1, the smart home control server 2, and the smart terminal 3. The first, second, and third entity may be the same entity or different entities based on different application scenarios.

In one example, when a network connection between the LED lighting device 1 and the smart home control server 2 is not stable, the LED lighting device 1 may process and recognize the video data and generate the control instructions accordingly. In another example, when volume of the video data collected by the LED lighting device 1 exceeds a handling capacity of the processing module of the LED lighting device 1 or when a confidence level of a recognition result produced by the LED lighting device 1 is lower than a preset threshold, the smart home control server 2 may perform the image processing and recognition of the behavioral information. In another example, when a network connection between the smart home control server 2 and the smart terminal 3 is not stable, the smart home control server 2 may generate the control instructions and send the control instructions to the LED lighting device 1, allowing the LED lighting device 1 to transmit the control instructions to the smart terminal 3.

Figure 2:
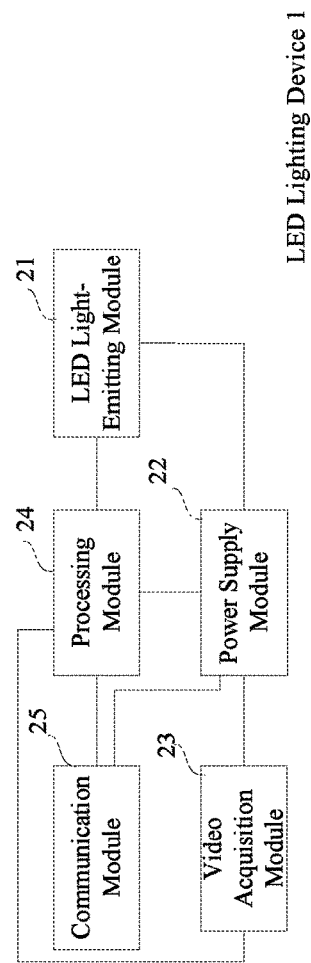
FIG. 2 is a structure diagram illustrating an exemplary LED lighting device consistent with various embodiments of the present disclosure.

FIG. 2 is a structure diagram illustrating an exemplary LED lighting device consistent with various embodiments of the present disclosure. As shown in FIG. 2, the exemplary LED lighting device 1 may include an LED light-emitting module 21, a power supply module 22, a video acquisition module 23, a processing module 24 and a communication module 25.

The power supply module 22 may be electrically connected to the LED light-emitting module 21, the video acquisition module 23, the processing module 24 and the communication module 25. The processing module 24 may be electrically connected to the video acquisition module 23 and the communication module 25.

The video acquisition module 23 may be configured to collect video data within a camera capture range, and send the video data to the processing module 24.

The processing module 24 may be configured to control the communication module 25 to send the video data to a smart home control server 2. The processing module 24 may include any suitable hardware processor, such as a microprocessor, a micro-controller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component.

In certain embodiments, the video acquisition module 23 may be a camera fitted for the structure and size of the exemplary LED lighting device 1. Specific model of the camera may be configured according to practical needs to integrate the camera with the LED lighting device. In an exemplary embodiment, the camera may have auto-focus functionalities and be able to adjust camera angles freely for a desirable shooting effect. The video acquisition module 23 may include the camera having auto-focus capabilities and an angle-adjustment structure. The camera may be connected to the angle-adjustment structure. The camera and the angle-adjustment structure may be electrically connected to the processing module. The angle-adjustment structure may be configured to rotate and turn the camera to adjust shooting angles when receiving control instructions from the processing module. In some embodiments, the camera may be placed on a panel or a housing of the LED lighting device. It is understood that, the position of the camera may vary according to the overall shape and structure of the LED lighting device.

In various embodiments of the present disclosure, the exemplary LED lighting device 1 further includes the video acquisition module 23. The video acquisition module 23 and the LED light-emitting module 21 may both use the power supply module 22 for obtaining power supply, and use the processing module 24 for receiving control instructions.

The LED light-emitting module 21 and other modules usually require a DC supply voltage and the required supply voltage is usually low. An exemplary hardware implementation of the LED lighting device may provide a viable structure for the power supply module 22 to facilitate integration of various modules including the video acquisition module 23.

In the exemplary hardware implementation, the power supply module 22 may include a rectifier circuit and step-down circuit. An input of the rectifier circuit may be electrically connected to an external AC power supply (e.g. a household power outlet). An output of the rectifier circuit may be electrically connected to an input of the step-down circuit. The LED light-emitting module 21 usually requires different a supply voltage than those of the processing module 24, the video acquisition module 23 and the communication module 25. The step-down circuit may be configured to convert the output of the rectifier circuit to various voltages to satisfy voltage requirements of different modules. In one embodiment, a first voltage output of the step-down circuit may be electrically connected to the LED light-emitting module 21. A second voltage output of the step-down circuit may be electrically connected to the processing module 24, the video acquisition module 23 and the communication module 25. The first voltage and the second voltage may be determined by specifications of the LED light-emitting module 21, the processing module 24, the video acquisition module 23, and the communication module 25.

The processing module 24 may function as a central control element of the exemplary LED lighting device 1. The processing module 24 may be configured to control transmissions between the communication module 25 and a communication module of the smart home control server 2, and send video data to the smart home control server 2. In certain embodiments, when the video acquisition module 23 is collecting video data, the video may stay the same for a long period of time (e.g., video of a hall way with no human traffic). In order to save energy and preserve resources, the processing module 24 may further be configured to determine whether the video data collected by the video acquisition module 23 is changed during a preset time duration. When there is no change for the preset duration, the processing module 24 may stop the communication module 25 from transmitting the video data to the smart home control server 2, until the processing module 24 determines that the video data collected by the video acquisition module 23 has changed. When the video data has changed, the processing module 24 may control the communication module 25 to resume sending the video data to the smart home control server 2.

In some embodiments, the processing module 24 may be further configured to parse and process the video data to detect behavioral information, generate control instructions according to the behavioral information, and control the communication module 25 to send the control instructions to corresponding smart terminal 3. Specifically, the processing module 24 may first parse and process the video data to detect behavioral information. The behavioral information may be a hand gesture, a limb movement, an action or a combination thereof. The processing module 24 may then generate control instructions according to the recognized behavioral information. For example, the recognized behavioral information may be an illegal intrusion. The processing module 24 may generate control instructions to instruct a smart terminal 3 to give sound, light and/or vibration alarms. The smart terminal 3 may be an LED lighting device, a speaker, a smart phone, etc. Further, the processing module 24 may instruct a telephone to call the police. Other applications described in previous embodiments may also be employed and are not repeated here. It should be noted that, the processing module 24 may implement various existing image recognition algorithms to perform image recognition, and generate control instructions according to the recognition result.

In some embodiments, when there is no change for the preset duration, the processing module 24 may stop parsing and processing the video data to detect behavioral information, until the processing module 24 determines that the video data collected by the video acquisition module 23 has changed. When the video data has changed, the processing module 24 may start parsing and processing the video data to detect behavioral information.

Further, in certain embodiments, the LED lighting device 1 may further include a memory 29 (not shown) coupled to the processing module 24. The memory 29 may be electrically connected to the processing module 24 and configured to store video data, audio data, a behavior database, and/or a control instruction library. The memory 29 may include any non-transitory computer-readable storage medium, such as a random-access memory (RAM), a read only memory, a flash memory, a volatile memory, a hard disk storage, or an optical medium. The behavior database and/or the behavioral instruction library may be preset. The processing module 24 may recognize and compare the video data with behavioral data stored in the behavior database in the memory 29, and obtain matching behavioral information. The behavioral information may be, for example, image date related to a person breaking into a building, a person falling down, a person breaking into a vehicle, two people fighting, etc. Further, the processing module 24 may search corresponding control instructions in the instruction library. The instructions may be, for example, initiating a sound alarm at the smart terminal 3, flashing the light of the LED light emitting module 21, or initiating an emergency call by the smart terminal, etc.

In some embodiments, the LED lighting device 1 may be considered as the smart terminal 3 and controlled by the smart home control server 2. Further, the processing module 24 may electrically connect to the LED light-emitting module 21. The communication module 25 may further be configured to receive control instructions from the smart home control server 2 and send the control instructions to the processing module 24. The control instructions may be used to instruct the LED light-emitting module 21 to adjust lighting brightness and/or to flash. The processing module 24 may control the LED light-emitting module 21 to operate according to the control instructions.

In various embodiments of the present disclosure, the exemplary LED lighting device 1 may integrate a video acquisition module and a communication module. Besides providing normal lighting functions (e.g., lighting up a room), the exemplary LED lighting device may collect video data and transmit the collected video data to a smart home control server through signal exchanges between the LED lighting device and the smart home control server. The smart home control server may parse and process the video data to detect behavioral information and generate corresponding control instructions. The smart home control server may send control instructions to a smart terminal through signal exchanges between the smart home control server and the smart terminal. The smart terminal may receive the control instructions and operate accordingly. Such configuration does not require additional effort to set up specialized monitoring devices. The exemplary LED lighting device may integrate video acquisition capabilities. Such an LED lighting device with integrated video acquisition capabilities is covert and may provide good surveillance results. Further, such configuration may save space and make the smart home environment simple and comfortable. On the other hand, the exemplary LED lighting device may integrate a communication module to facilitate interactions with a smart home control server. Such configuration enables timely detection and prevention of illegal activities and/or unsafe behaviors, as well as recognition and execution of specified user instructions, which may expand various applications of smart terminals at home.

Figure 3:
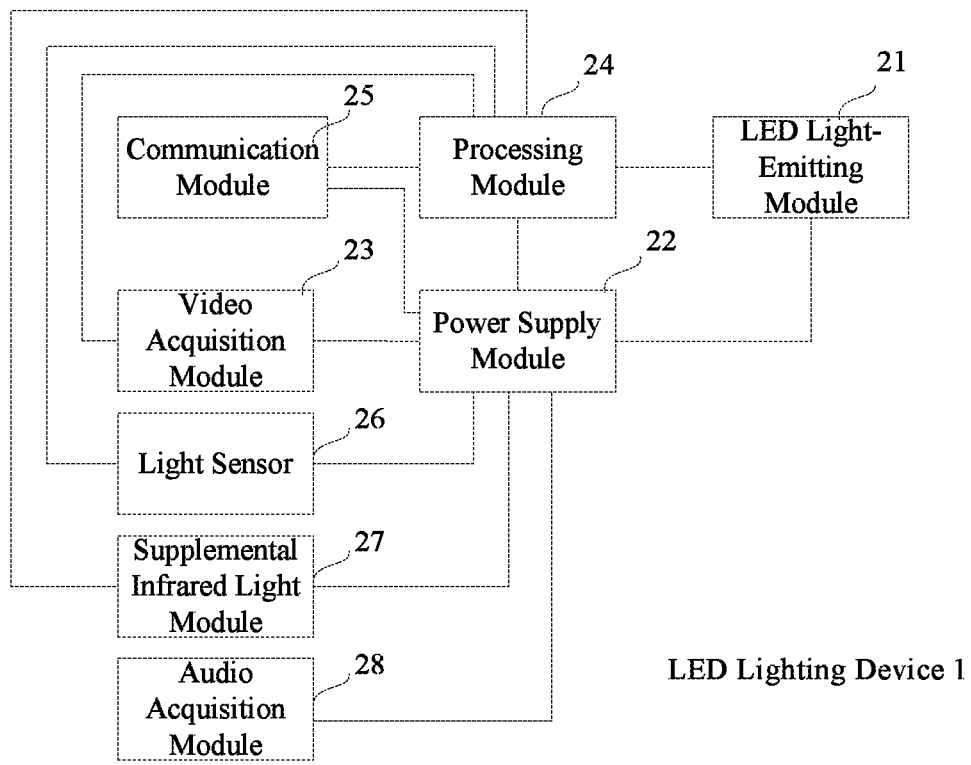
FIG. 3 is a structure diagram illustrating another exemplary LED lighting device consistent with various embodiments of the present disclosure.

On the basis of various embodiments illustrated in FIG. 2, the exemplary LED lighting device 1 may further integrate other functional modules. As shown in FIG. 3, the exemplary LED lighting device 1 may further include a light sensor 26 and a supplemental infrared light module 27. The supplemental infrared light module 27 may be electrically connected to the power supply module 22 and the processing module 24. The light sensor 26 may be electrically connected to the power supply module 22 and the processing module 24.

The light sensor 26 may be configured to detect light intensity in a surrounding area of the LED lighting device 1 and send the light intensity data to the processing module 24.

The processing module 24 may further be configured to control an on/off status of the supplemental infrared light module 27 and an intensity of supplemental light provided by the supplemental infrared light module 27.

In certain embodiments, for example, when no one is at home at night, the LED light-emitting module 21 of the LED lighting device 1 may be off, thus there may be poor lighting around the exemplary LED lighting device 1 and video data collected by the video acquisition module 23 may be too dark. The smart home control server 2 may have difficulty parsing and recognizing the video data. The exemplary LED lighting device 1 may further include the light sensor 26. The light sensor 26 may be composed with various photosensitive units and configured to determine ambient light intensity around the LED lighting device. The processing module 24 may further be configured to control the supplemental infrared light module 27 to switch on and increase an intensity of supplemental light provided by the supplemental infrared light module 27. When the light intensity detected by the light sensor 26 reaches a certain value, the processing module 24 may further be configured to control the supplemental infrared light module 27 to decrease the intensity of the supplemental light, or to turn off the supplemental infrared light module 27.

In addition, the exemplary LED lighting device 1 may further integrate an audio acquisition module 28 which may supplement the video data collected by the video acquisition module 23. The audio acquisition module 28 may be a microphone and configured to collect audio signals. Similarly to the video data transmission method, the audio acquisition module 28 may send audio signals to the processing module 24. The processing module 24 may be configured to control the communication module 25 to send the audio signals to the smart home control server 2.

In certain embodiments, for example, the video acquisition module 23 may collect video data about someone or some objects entering from a door or a window, while the audio acquisition module 28 may collect glass shattering sounds from the door or the window or other destruction sounds. The smart home control server 2 may combine these video and audio signals to recognize the behavioral information as an intrusion, and generate corresponding control instructions to control the smart terminal 3.

The above embodiments describe how various modules integrated in the exemplary LED lighting device 1 function and connect with each other. Further, the exemplary LED lighting device may interact with the smart terminal 3 through the communication module 25 to facilitate user configurations on the various functional modules. For example, a user may install an APP on the smart terminal 3 such as a mobile phone or a tablet computer. When using the APP, the user may set configuration information of the exemplary LED lighting device 1 by menu options or manual input. The configuration information may include operation parameters of at least one of the LED light-emitting module 21, the video acquisition module 23, the light sensor 26 and the audio acquisition module 28. The operation parameters may include but not limited to on-time, off-time, intensity of a light emitted by the LED light-emitting module 21, a camera angle of the video acquisition module 23, etc. The smart terminal 3 may use its communication module to transmit the configuration information to the communication module 25 of the exemplary LED lighting device 1. The communication module 25 may send the configuration information to the processing module 24. The processing module 24 may control an operational state of corresponding module(s) according to the configuration information.

In various embodiments consistent with the present disclosure, the exemplary LED lighting device 1 may further integrate the light sensor 26 and the supplemental infrared light module 27, which may provide supplemental light to the video acquisition module 23 when there is poor lighting. The exemplary LED lighting device 1 may further integrate the audio acquisition module 28, which allows the smart home control server 2 to perform comprehensive analysis and detect behavioral information combining both video and audio data. The precision of behavior recognition may be enhanced. Further, through data interactions between the communication modules of the smart terminal 3 and the exemplary LED lighting device 1, users may easily configure various function modules of the exemplary LED lighting device through the smart terminal 3, which enhances user experience.

Figure 4:
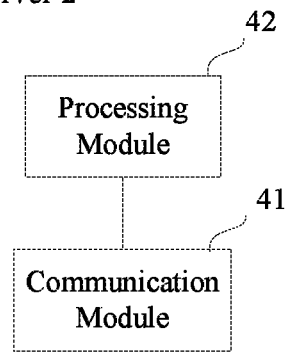
FIG. 4 is a structure diagram illustrating an exemplary smart home control server consistent with various embodiments of the present disclosure.

FIG. 4 is a structure diagram illustrating an exemplary smart home control server consistent with various embodiments of the present disclosure. As shown in FIG. 4, the exemplary smart home control server 2 may include a communication module 41 and a processing module 42. The communication module 41 and the processing module 42 may be electrically connected.

The communication module 41 may be configured to receive a video data from the LED lighting device 1 and send the video data to the processing module 42.

The processing module 42 may be configured to parse and process the video data to detect behavioral information, generate control instructions according to the behavioral information and control the communication module 41 to send the control instructions to corresponding smart terminal 3.

The exemplary smart home control server 2 may be a server in a home network or a cloud server. The processing module 42 may first parse and process the video data to detect behavioral information. The behavioral information may be a hand gesture, a limb movement, an action or a combination thereof. The processing module 42 may then generate control instructions according to the recognized behavioral information. For example, in the embodiment described in FIG. 1, the recognized behavioral information may be an illegal intrusion. The processing module 42 may generate control instructions to instruct a smart terminal 3 to give sound, light and/or vibration alarms. The smart terminal 3 may be an LED lighting device, a speaker, a smart phone, etc. Further, the processing module 42 may instruct a telephone to call the police. Other applications described in previous embodiments may also be employed in the exemplary smart home control server 2 and are not repeated here. It should be noted that, the processing module 42 may implement various existing image recognition algorithms to perform image recognition, and generate control instructions according to the recognition result.

Further, in certain embodiments, the exemplary smart home control server 2 may further include a memory module 43 (not shown). The memory module 43 may be electrically connected to the processing module 42 and configured to store video data, audio data, a behavior database, and/or a control instruction library. The behavior database and/or the behavioral instruction library may be preset. The processing module 42 may recognize and compare the video data with behavioral data stored in the behavior database in the memory module 43, and obtain matching behavioral information. The behavioral information may be, for example, image date related to a person breaking into a building, a person falling down, a person breaking into a vehicle, two people fighting, etc. Further, the processing module 42 may search corresponding control instructions in the instruction library. The instructions may be, for example, initiating a sound alarm at the smart terminal 3, flashing the light of the LED light emitting module 21, or initiating an emergency call by the smart terminal, etc.

In embodiments consistent with the present disclosure, each piece of behavioral information may correspond to one or more instructions in the instruction library. The LED lighting device 1, through the processing module 24, may look up one or more instructions based on the determined behavioral information. For example, if the process module 24 determines that a person has fallen down based on the collected video data, the process module 24 may look up the instructions corresponding to that behavioral information (a fall) in the instruction library. The instructions corresponding to an identified fall may be initiating one or more emergency calls on smart terminal 3, turning on the LED lighting device at the location of the fall, etc.

In some embodiments consistent with the present disclosure, the processing module 24 may determine the behavioral information based on both the video data acquired by the video acquisition module 23 and the audio data acquired by the audio acquisition module 28. In some cases, the video data and audio data may both indicate the same behavioral information (e.g., a fall, a break-in, etc.). The processing module 24 may determine the behavioral information. The processing module 24 may further look up the instructions corresponding to the behavioral information in the instruction library. In other cases, the video data and audio data may indicate different behaviors (e.g., video data indicating a fall while audio data indicating a break-in). The processing module 24 may then identify the behavioral information as "undetermined." The instruction corresponding to the "undetermined" behavioral information in the instruction library may be to notify the smart terminal 3 or other terminals connected to the smart home control server 2 that the video and audio data need to be reviewed by a user. Such a notification may be a message displayed on a user interface, a call to a designated number, an audio notification pushed to one or more areas inside or outside the home, or a combination thereof. Further, when the behavioral information is "undetermined," the processing module 24 may adjust the settings for the corresponding lighting emitting module 21, video acquisition module 23, and audio acquisition module 28 so that the future behavior recognition results may be more accurate. For example, the processing module 24 may increase the brightness level of the lighting emitting module 21 at the monitored location; adjust the relevant orientation of the video and audio acquisition modules 23 and 28 to achieve better behavior recognition results.

In addition, when the LED lighting device 1 integrates the audio acquisition module 28, the communication module 41 of the exemplary smart home control server 2 may receive audio data from the LED lighting device 1. The processing module 42 may be configured to parse and recognize behavioral information according to both the video data and the audio data. Detailed description may be found in various embodiments according to FIG. 3.

It should be noted that, users may upload the behavior database and/or the behavioral instruction library to the smart home control server 2 and/or the LED lighting device 1 in advance. Users may also customize the behavior database and/or the behavioral instruction library in advance. Further, entries in the behavior database and the behavioral instruction library may be added, deleted or updated according to practical needs. In certain embodiments, users may directly log into the exemplary smart home control server 2 to upload and/or update data in the behavior database and/or the behavioral instruction library. Further, users may also use the smart terminal 3 to upload and/or update data to the exemplary smart home control server 2 and/or the LED lighting device 1. For example, a user may install an APP on the smart terminal 3 such as a mobile phone or a tablet computer. When using the APP, the user may input data entries by menu options or manual input. The smart terminal 3 may send the data entries to the exemplary smart home control server 2 or the LED lighting device 1 through its communication module. In some embodiments, the processing module 42 may store the data entries in the memory module 43. In some embodiments, the processing module 24 may store the data entries in the memory 29.

Further, to allow users to watch video data collected by the LED lighting device 1 in real-time, the processing module 42 may control the communication module 41 to send the video data to the smart terminal 3. When the smart terminal 3 is installed with the APP, users may play the video data through the APP.

In various embodiments consistent with the present closure, the exemplary smart home control server 2 may interact with the LED lighting device 1 and the smart terminal 3 through their communication modules. The exemplary smart home control server 2 may parse and recognize video data to detect behavioral information and generate corresponding control instructions. The smart home control server 2 may send control instructions to the smart terminal 3 through signal exchanges between the smart home control server 2 and the smart terminal 3. The smart terminal 3 may receive the control instructions and operate accordingly. Through interactions among the LED lighting device 1, the smart home control server 2 and the smart terminal 3, controlling the smart terminals may become more efficient and convenient. The LED lighting device, the smart home control server and the smart terminal may enable timely detection and prevention of illegal activities and/or unsafe behaviors, as well as recognition and execution of specified user instructions, which may expand various applications of smart terminals at home.

Figure 5:
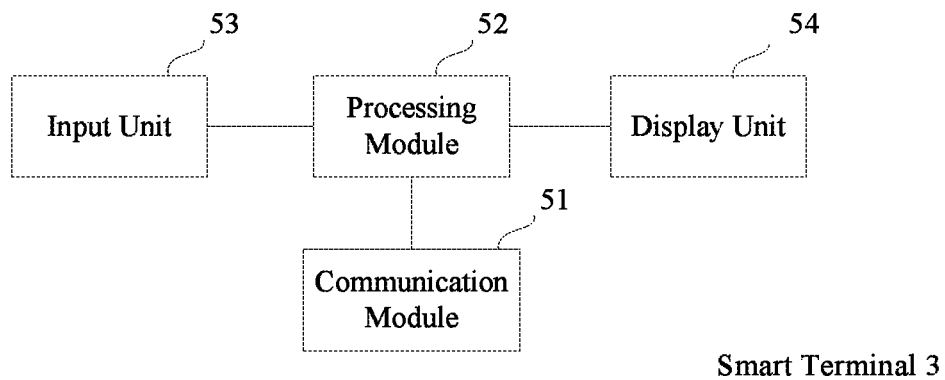
FIG. 5 is a structure diagram illustrating an exemplary smart terminal for controlling a smart home environment consistent with various embodiments of the present disclosure.

FIG. 5 is a structure diagram illustrating an exemplary smart terminal for controlling a smart home consistent with various embodiments of the present disclosure. As shown in FIG. 5, the exemplary smart terminal 3 may include a communication module 51 and a processing module 52. The communication module 51 and the processing module 52 may be electrically connected.

The communication module 51 may be configured to receive control instructions from the smart home control server 2 and/or the LED lighting device 1 and send the control instructions to the processing module 52.

The processing module 52 may be configured to perform corresponding operations according to the control instructions.

The exemplary smart terminal 3 may be various household electrical appliances, such as a smart refrigerator, a smart air conditioner, a speaker, a smart phone, a smart watch, a tablet computer, a laptop computer, a phone, etc.

The smart home control server 2 or the LED lighting device 1 may generate and send different control instructions to different types of smart terminals to carry out corresponding operations. For example, the control instructions may notify a smart terminal with lighting capabilities to produce alarms by light. In another example, the control instructions may notify a smart terminal with voice capabilities to produce alarms by sound/announcement. In another example, the control instructions may notify a smart terminal with vibration capabilities to produce alarms by vibration. Further, for devices such as a refrigerator or a smart air-conditioner, the control instructions may notify them to power on and set a desired temperature. For devices such as a speaker, a smart phone or a tablet computer, the control instructions may notify them to play songs and/or movies. Other types of smart terminals are not exhausted here.

In various embodiments, the exemplary smart terminal 3 may enable users to configure various function modules of the LED lighting device 1. Further, users may use the exemplary smart terminal 3 to add, delete and/or update contents in the behavior database and/or the behavioral instruction library in the smart home control server 2 or the LED lighting device 1. When the exemplary smart terminal 3 is a smart phone, a smart watch, a tablet computer or a laptop computer, an APP may be installed. Users may configure the smart home control server 2 and/or the LED lighting device 1 through the APP.

In an exemplary implementation, the exemplary smart terminal 3 may include a communication module 51, a processing module 52 and an input unit 53. The input unit 53 may be electrically connected to the processing module 52. The input unit 53 may be a keyboard, a mouse, a voice inputting component, a touch screen, etc. The input unit 53 may be configured to receive a new data entry of the behavior database and/or the control instruction library from a user, and send the new data entry to the processing module 52. The processing module 52 may be configured to send the new data entry to the smart home control server 2 and/or the LED lighting device 1.

The input unit 53 may also be configured to receive configuration information from a user, and send the configuration information to the processing module 52. The configuration information may include operation parameters of at least one of the the LED light-emitting module 21, the video acquisition module 23, the light sensor 26 and the audio acquisition module 28. For example, the operation parameters may include a light brightness level or a light color of the LED light-emitting module 21, a defined configuration (angle, light exposure, background noise filtering, etc.) for the video acquisition module 23 and the audio acquisition module 28, the threshold brightness level for the light sensor 26, or a threshold sound level for the audio acquisition module 28. The processing module 52 may control the communication module 51 to send the configuration information to the LED lighting device 1 to implement such configuration at respective modules. For example, device 1 may turn on the LED light-emitting module 21 at the defined light brightness level or light color. Device 1 may operate the video acquisition module 23 with a specified angle, light exposure, etc. The light sensor 26 may determine whether the light in the surrounding area is above or below (or equal to) a threshold value. The audio acquisition module 28 may also start recording audio data if it detects the sound level in the surrounding area is above the threshold sound level.

Further, users may watch captured video on the APP in real-time. The exemplary smart terminal 3 may further include a display unit 54. The display unit 54 may be electrically connected to the processing module 52. The communication module 51 may further be configured to receive video data from the smart home control server 2 and/or the LED lighting device 1 and send the video data to the processing module 52. The processing module 52 may be further configured to control the display unit 54 to present the video data.

In various embodiments consistent with the present disclosure, the exemplary smart terminal 3 interact with the smart home control server 2 and/or the LED lighting device 1 through their communication modules. The smart home control server 2 and/or the LED lighting device 1 may parse and process the video data to detect behavioral information and generate corresponding control instructions. The exemplary smart terminal 3 may receive control instructions through its communication module, and perform corresponding operations by the processing module. Through interactions among the LED lighting device 1, the smart home control server 2, and the smart terminal 3, controlling the smart terminal may become more efficient and convenient. The LED lighting device, the smart home control server and the smart terminal may enable timely detection and prevention of illegal activities and/or unsafe behaviors, as well as recognition and execution of specified user instructions, which may expand various applications of smart terminals at home. Further, the exemplary smart terminal 3 may install an APP. Users may use the input unit 53 to enter or select configuration information of the LED lighting device 1, and/or update data entries in the smart home control server 2 or the LED lighting device 1. Users may easily configure various function modules of the LED lighting device 1 through the exemplary smart terminal 3, and/or update data entries in the smart home control server, which enhances user experience.

Figure 6:
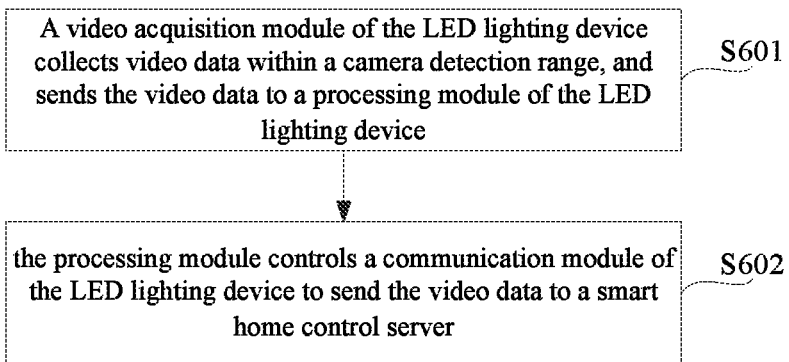
FIG. 6 is a flow chart illustrating an exemplary method for controlling a smart home environment using an LED lighting device consistent with various embodiments of the present disclosure.

FIG. 6 is a flow chart illustrating an exemplary method for controlling a smart home environment using an LED lighting device consistent with various embodiments of the present disclosure. As shown in FIG. 6, the exemplary method may include the following steps.

In step S601, a video acquisition module in the LED lighting device may collect video data within a camera's range. The video acquisition module may send the video data to a processing module of the LED lighting device.

In step S602, the processing module may control a communication module of the LED lighting device to send the video data to a smart home control server.

In certain embodiments, before step S601, the method may further include the following steps.

A light sensor of the LED lighting device may detect light intensity in a surrounding area of the LED lighting device and send the light intensity data to the processing module.

The processing module may control an on/off status of a supplemental infrared light module and intensity of the supplement light provided by the supplemental infrared light module.

In certain embodiments, the exemplary method may further include the following steps.

An audio acquisition module of the LED lighting device may collect audio data and send the audio data to the processing module.

The processing module may control the communication module to send the audio data to the smart home control server.

In certain embodiments, the exemplary method may further include the following steps.

The communication module may receive configuration information from a smart terminal and send the configuration information to the processing module. The configuration information may include operation parameters of at least one of an LED light-emitting module, the video acquisition module, the light sensor and the audio acquisition module.

The processing module may control an operational state of a corresponding module according to the configuration information.

In certain embodiments, after step S602, the exemplary method may further include the following steps.

The communication module may receive control instructions from the smart home control server and send the control instructions to the processing module. The control instructions may be used to notify the LED light-emitting module to adjust lighting brightness and/or to flash.

The processing module may control an operational state of the LED light-emitting module according to the control instructions.

In certain embodiments, after step S602, the exemplary method may further include the following step.

When the processing module determines no change happens in the video data collected by the video acquisition module for a preset time duration, the processing module may stop the communication module from transmitting the video data to the smart home control server, until the processing module determines that the video data collected by the video acquisition module is changed again.

The LED lighting device in the exemplary method may employ various detailed structures and functional modules and have corresponding advantageous effects. Detailed description may be found in various embodiments according to FIG. 2 and FIG. 3 and will not be repeated here.

FIG. 7 is a flow chart illustrating another exemplary method for controlling a smart home using an LED lighting device consistent with various embodiments of the present disclosure. As shown in FIG. 7, the exemplary method may include the following steps.

In step S701, a smart home control server may receive video data from an LED lighting device, and send the video data to a processing module of a smart home control server.

In step S702, the processing module may parse and process the video data to detect behavioral information, generate control instructions according to the behavioral information and control the communication module to send the control instructions to a corresponding smart terminal.

In certain embodiments, the exemplary method may further include the following steps.

The communication module may receive audio data from an audio acquisition module of the LED lighting device and send the audio data to the processing module.

The processing module may parse and process the video data and the audio data, and detect the behavioral information.

In certain embodiments, in step S702, the processing module may recognize and compare the video data with behavior data stored in a behavior database in a memory module of the smart home control server, and detect matching behavioral information. Further, the processing module may search corresponding control instructions of the detected behavioral information in a behavioral instruction library.

In certain embodiments, after step S702, the exemplary method may further include the following step.

The processing module may control the communication module to send the video data to a smart terminal to present the video data.

In certain embodiments, the exemplary method may further include the following steps.

The communication module may receive a renewed data entry of the behavior database and/or the behavioral instruction library from the smart terminal, and send the renewed data entry to the processing module.

The processing module may update the behavior database and/or update the behavioral instruction library according to the renewed data entry.

The smart home control server in the exemplary method may employ various detailed structures and functional modules and have corresponding advantageous effects. Detailed description may be found in various embodiments according to FIG. 4 and will not be repeated here.

FIG. 8 is a flow chart illustrating another exemplary method for controlling a smart home environment using an LED lighting device consistent with various embodiments of the present disclosure. As shown in FIG. 8, the exemplary method may include the following steps.

In step S801, a communication module of a smart terminal may receive control instructions from a smart home control server or an LED lighting device and send the control instructions to a processing module of the smart terminal.

In step S802, the processing module may perform corresponding operations according to the control instructions.

In certain embodiments, the exemplary method may further include the following steps.

An input unit of the smart terminal may receive a user-inputted renewed data entry of the behavior database and/or the behavioral instruction library, and send the renewed data entry to the processing module.

The processing module may control the communication module to the renewed data entry of the behavior database and/or the behavioral instruction library to the smart home control server or the LED lighting device.

In certain embodiments, the exemplary method may further include the following steps.

The input unit of the smart terminal may receive configuration information inputted by a user and send the configuration information to the processing module. The configuration information may include operation parameters of at least one of an LED light-emitting module, a video acquisition module, a light sensor and an audio acquisition module.

The processing module may control the communication module to send the configuration information to the smart home control server or the LED lighting device.

In certain embodiments, the exemplary method may further include the following steps.

The communication module may receive video data from the smart home control server or the LED lighting device and send the video data to the processing module.

The processing module may control a display unit of the smart terminal to present the video data.

The smart terminal in the exemplary method may employ various detailed structures and functional modules and have corresponding advantageous effects. Detailed description may be found in various embodiments according to FIG. 5 and will not be repeated here.

Figure 10:
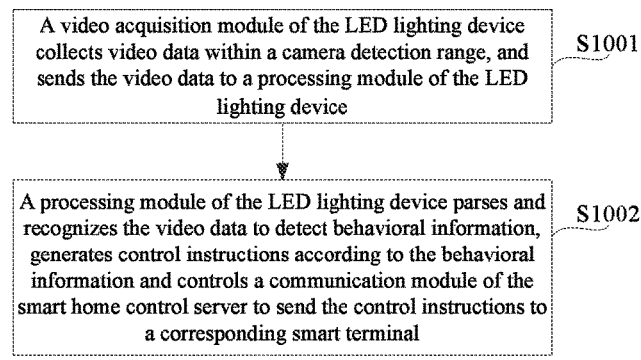
FIG. 10 is a flow chart illustrating another exemplary method for controlling a smart home environment using an LED lighting device consistent with various embodiments of the present disclosure.

FIG. 10 is a flow chart illustrating another exemplary method for controlling a smart home environment using an LED lighting device consistent with various embodiments of the present disclosure. The exemplary method may be implemented in consistence with the system and devices shown in FIGS. 1-5 and 9. As shown in FIG. 10, the exemplary method may include the following steps.

In step S1001, a video acquisition module in the LED lighting device may collect video data within a camera's range. The video acquisition module may send the video data to a processing module of the LED lighting device. Step 1001 may be implemented in a similar manner as step 601 as shown in FIG. 6.

In step S1002, a processing module of the LED lighting device parses and recognizes the video data to detect behavioral information, generates control instructions according to the behavioral information and controls a communication module of the LED lighting device to send the control instructions to a corresponding smart terminal.

In one example, when detecting a person or an object breaking in a door or a window in the video data, the processing module determines the behavioral information as an intrusion, and sends control instructions to notify the smart terminal to generate alarm by at least one of sound, light, and vibration.

In another example, when detecting an elderly person or a child tripping or falling in the video data, the processing module determines the behavioral information as an unsafe activity, and sends control instructions to notify the smart terminal to generate alarm by at least one of sound, light, and vibration; and In another example, when detecting a specified instructive behavior by a user, the processing module determines the behavioral information as an instructive behavior, and sends control instructions to notify the smart terminal to perform corresponding controls, wherein the specified instructive behavior is a hand gesture or a limb movement preset by the user.

In certain embodiments, the exemplary method may further include the following steps. The LED lighting device further provides a memory module to store at least one of the video data, audio data, a behavior database and a behavioral instruction library. The processing module of the LED lighting device recognizes and compares the video data with data stored in the behavior database to detect matching behavioral information; and searches control instructions according to the detected behavioral information in the behavioral instruction library.

In certain embodiments, the exemplary method may further include the following steps.

An audio acquisition module of the LED lighting device may collect audio data and send the audio data to the processing module. The processing module may parse and recognize both the audio data and the video data to detect behavioral information.

In certain embodiments, the exemplary method may further include the following steps.

The communication module may receive configuration information from a smart terminal and send the configuration information to the processing module. The configuration information may include operation parameters of at least one of an LED light-emitting module, the video acquisition module, the light sensor and the audio acquisition module. The processing module may control an operational state of a corresponding module according to the configuration information.

In certain embodiments, after step S1002, the exemplary method may further include the following steps.

The control instructions generated by the processing module may be used to notify the LED light-emitting module to adjust lighting brightness and/or to flash. The processing module may control an operational state of the LED light-emitting module according to the control instructions.

In certain embodiments, after step S1002, the exemplary method may further include the following step.

When the processing module determines no change happens in the video data collected by the video acquisition module for a preset time duration, the processing module may stop parsing and processing the video data to detect behavioral information, until the processing module determines that the video data collected by the video acquisition module is changed again.

The LED lighting device in the exemplary method may employ various detailed structures and functional modules and have corresponding advantageous effects. Detailed description may be found in various embodiments according to FIG. 2 and FIG. 3 and will not be repeated here.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Comparing to the prior art, the present disclosure provides a smart home control system including one or more LED lighting devices, a smart home control server and one or more smart terminals. The smart home control system does not require additional effort to set up specialized monitoring devices. The LED lighting devices may integrate video acquisition capabilities. Such LED lighting devices may provide good surveillance results. Further, such configuration may save spaces and make the smart home environment simple and comfortable. On the other hand, through interactions among the LED lighting device, the smart home control server and the smart terminal, controlling the smart terminal may become more efficient and convenient. The smart home control system may enable timely detection and prevention of illegal activities or unsafe behaviors, as well as recognition and execution of specified user instructions. Such a smart home control system may expand various applications of smart terminals at home.

The present disclosure also provides an LED lighting device, which integrates a video acquisition module and a communication module. Besides providing normal lighting functions, the LED lighting device may collect video data and transmit the collected video data to a smart home control server through signal exchanges between the LED lighting device and the smart home control server. The smart home control server may parse and process the video data to detect behavioral information and generate corresponding control instructions. The smart home control server may send control instructions to a smart terminal through signal exchanges between the smart home control server and the smart terminal. The smart terminal may receive the control instructions and operate accordingly.

The LED lighting device may further integrate a light sensor and a supplemental infrared light module, which may provide supplemental light to the video acquisition module when there is insufficient lighting. In addition, the LED lighting device may further include the audio acquisition module, which allows the smart home control server to perform comprehensive analysis and detect behavioral information combining both video and audio data. The precision of behavior recognition may be enhanced. Further, through data interactions between the communication modules of the smart terminal and the LED lighting device, users may easily configure various function modules of the exemplary LED lighting device through the smart terminal, which enhances user experience.

The present disclosure further provides a smart home control server and a smart terminal which may interact with each other and the LED lighting device and through their communication modules. The smart home control server may parse and process the video data to detect behavioral information and generate corresponding control instructions to be executed by the smart terminals. The smart home control server may include a memory module configured to store video data, audio data, a behavior database, and/or a control instruction library. Users may directly log into the exemplary smart home control server to upload and/or update data in the behavior database and/or the behavioral instruction library. The exemplary smart terminal may receive control instructions through its communication module, and perform corresponding operations. Further, the smart terminal may install an APP. Users may use an input unit to enter or select configuration information of the LED lighting device, and/or update data entries in the smart home control server. Users may easily configure various function modules of the LED lighting device through the exemplary smart terminal, and/or update data entries in the smart home control server, which enhances user experience.

What is claimed is:

1. An LED lighting device, comprising an LED light-emitting module, a power supply module, a video acquisition module, a communication module and a processing module; wherein:

the power supply module is electrically connected to the LED light-emitting module, the video acquisition module, the communication module and the processing module, respectively;

the processing module is electrically connected to the video acquisition module and the communication module;

the video acquisition module is configured to collect video data within a camera detection range, and send the video data to the processing module; and the processing module is configured to parse and process the video data to detect behavioral information, generate control instructions according to the behavioral information, and control the communication module to send the control instructions to a smart terminal.

2. The LED lighting device according to claim 1, further comprising:

a light sensor configured to detect light intensity in a surrounding area of the LED lighting device and send the light intensity data to the processing module; and a supplemental infrared light module configured to provide supplemental light for the video acquisition module;

wherein:
the infrared supplemental light module is electrically connected to the power supply module and the processing module;
the light sensor is electrically connected to the power supply module and the processing module; and
the processing module is further configured to control an on/off status of the infrared supplemental light module and intensity of the supplemental light provided by the infrared supplemental light module.

3. The LED lighting device according to claim 2, further comprising:
an audio acquisition module configured to collect audio data and send the audio data to the processing module;
wherein:
the audio acquisition module is electrically connected to the power supply module and the processing module; and
the processing module is further configured to parse and process the video data and the audio data to detect the behavioral information.

4. The LED lighting device according to claim 3, wherein:
the communication module is further configured to receive configuration information from the smart terminal and send the configuration information to the processing module;
the configuration information includes operation parameters of at least one of the LED light-emitting module, the video acquisition module, the light sensor, and the audio acquisition module; and
the processing module is further configured to control an operational state of a corresponding module according to the configuration information.

5. The LED lighting device according to claim 1, wherein:
the processing module is electrically connected to the LED light-emitting module;
the control instructions generated by the processing module are used to notify the LED light-emitting module to adjust a lighting brightness level or flash; and
the processing module is further configured to control an operational state of the LED light-emitting module according to the control instructions.

6. The LED lighting device according to claim 1, wherein the processing module is further configured to:
when there is no change in the video data collected by the video acquisition module for a preset time duration, stop the processing module from parsing and processing the video data to detect behavioral information; and
when the video data has changed, start parsing and processing the video data to detect behavioral information.

7. The LED lighting device according to claim 1, wherein the power supply module further includes:
a step-down circuit configured to provide different voltages to corresponding modules of the LED lighting device; and
a rectifier circuit configured to output a DC voltage to the step-down circuit;
wherein:
an input of the rectifier circuit is electrically connected to an external AC power supply;
an output of the rectifier circuit is electrically connected to an input of the step-down circuit;
a first voltage output of the step-down circuit is electrically connected to the LED light-emitting module; and
a second voltage output of the step-down circuit is electrically connected to the processing module, the video acquisition module and the communication module.

8. The LED lighting device according claim 1, wherein:
the video acquisition module further includes a camera having auto-focus capabilities and an angle-adjustment structure;
the camera is connected to the angle-adjustment structure;
the camera and the angle-adjustment structure are electrically connected to the processing module; and
the angle-adjustment structure is configured to rotate and turn the camera to adjust shooting angles when receiving control instructions from the processing module.

9. The LED lighting device according to claim 1, wherein the communication module is a wireless communication module.

10. A smart home control system using at least one LED lighting device, comprising:
at least one LED lighting device configured to include an LED light-emitting module, a power supply module, a video acquisition module, a processing module and a communication module; and
at least one smart terminal;
wherein:
the video acquisition module is configured to collect video data within a camera detection range, and send the video data to the processing module of the LED lighting device;
the processing module is configured to parse and process the video data to detect behavioral information, generate control instructions according to the behavioral information, and control the communication module to send the control instructions to the smart terminal; and
the smart terminal is configured to receive the control instructions and execute the control instructions.

11. The smart home control system according to claim 10, wherein:
the at least one LED lighting device further comprises: a memory module configured to store at least one of the video data, audio data, a behavior database, and a control instruction library; and
the processing module is further configured to recognize and compare the video data with data stored in the behavior database to detect matching behavioral information; and
search the control instructions according to the detected behavioral information in the behavioral instruction library.

12. The smart home control system according to claim 11, wherein:
the smart terminal is further configured to receive one or more data entries for at least one of the behavior database and the behavioral instruction library from a user, and send the data entry to the at least one LED lighting device; and
the processing module is further configured to update at least one of the behavior database and the behavioral instruction library according to the data entries.

13. The smart home control system according to claim 10, wherein:
the smart terminal is further configured to receive configuration information from a user, and send the configuration information to the LED lighting device;
the configuration information includes operation parameters for one or more modules of the LED lighting device, wherein the one or more modules include at least one of the LED light-emitting module, the video acquisition module, a light sensor, and an audio acquisition module; and the processing module of the LED lighting device is further configured to control an operational state of a corresponding module according to the configuration information.

14. The smart home control system according to claim 10, wherein:

the smart terminal is one or more of the LED lighting device, a smart refrigerator, a smart air conditioner, a speaker, a smart phone, a smart watch, a tablet computer, a laptop computer and a telephone.

15. The smart home control system according to claim 10, wherein:

when detecting a person or an object breaking in a door or a window in the video data, the processing module determines the behavioral information as an intrusion, and sends control instructions to notify the smart terminal to generate alarm by at least one of sound, light, and vibration;

when detecting an elderly person or a child tripping or falling in the video data, the processing module determines the behavioral information as an unsafe activity, and sends control instructions to notify the smart terminal to generate alarm by at least one of sound, light, and vibration; and when detecting a specified instructive behavior by a user, the processing module determines the behavioral information as an instructive behavior, and sends control instructions to notify the smart terminal to perform corresponding controls, wherein the specified instructive behavior is a hand gesture or a limb movement preset by the user.

16. A method for controlling a smart home environment using an LED lighting device, comprising:

providing at least one LED lighting device configured to include an LED light-emitting module, a power supply module, a video acquisition module, a processing module and a communication module;

collecting, by the video acquisition module of the LED lighting device, video data in a camera detection range;

parsing and recognizing, by the processing module of the LED lighting device, the video data to detect behavioral information;

generating, by the processing module of the LED lighting device, control instructions according to the behavioral information; and sending, by the communication module of the LED lighting device, the control instructions to a corresponding smart terminal.

17. The method for controlling a smart home environment according to claim 16, further comprising:

collecting, by an audio acquisition module of the LED lighting device, audio data from an area surrounding the LED lighting device; and parsing and recognizing, by the processing module of the LED lighting device, both the video data and the audio data to detect the behavioral information.

18. The method for controlling a smart home environment according to claim 16, wherein generating control instructions further includes:

providing a memory module in the LED lighting device to store at least one of the video data, audio data, a behavior database and a behavioral instruction library;

recognizing and comparing, by the processing module of the LED lighting device, the video data with data stored in the behavior database to detect matching behavioral information; and searching control instructions according to the detected behavioral information in the behavioral instruction library.

19. The method for controlling a smart home environment according to claim 18, further comprising:

receiving, by the smart terminal, one or more data entries for at least one of the behavior database and the behavioral instruction library from a user;

sending, by the smart terminal, the data entries to the LED lighting device; and updating, by the processing module of the LED lighting device, at least one of the behavior database and the behavioral instruction library according to the data entries.

20. The method for controlling a smart home environment according to claim 16, further comprising:

receiving, by the smart terminal, a configuration information from a user, wherein the configuration information includes operation parameters for one or more modules of the LED lighting device, and the one or more modules include at least one of the LED light-emitting module, the video acquisition module, a light sensor and an audio acquisition module;

sending, by the smart terminal, the configuration information to the LED lighting device; and controlling, by the processing module of the LED lighting device, an operational state of a corresponding module according to the configuration information.

* * * * *